United States Patent
Kekalainen et al.

(10) Patent No.: US 9,640,063 B2
(45) Date of Patent: May 2, 2017

(54) SENSOR DEVICE FOR REMOTE MONITORING

(71) Applicant: Enevo Oy, Espoo (FI)

(72) Inventors: Fredrik Kekalainen, Espoo (FI); Johan Engstrom, Tuusula (FI)

(73) Assignee: Enevo Oy, Espoo (FI)

( * ) Notice: Subject to any disclaimer, the term of this patent is extended or adjusted under 35 U.S.C. 154(b) by 0 days.

(21) Appl. No.: 14/761,417

(22) PCT Filed: Jan. 28, 2014

(86) PCT No.: PCT/EP2014/000224
§ 371 (c)(1),
(2) Date: Jul. 16, 2015

(87) PCT Pub. No.: WO2014/114470
PCT Pub. Date: Jul. 31, 2014

(65) Prior Publication Data
US 2015/0339914 A1    Nov. 26, 2015

(30) Foreign Application Priority Data

Jan. 28, 2013 (GB) .................................. 1301499.8

(51) Int. Cl.
*G08B 29/00* (2006.01)
*G08B 29/02* (2006.01)
(Continued)

(52) U.S. Cl.
CPC ............ *G08B 29/02* (2013.01); *G01D 4/002* (2013.01); *G01D 11/245* (2013.01);
(Continued)

(58) Field of Classification Search
CPC ... G06Q 10/30; G06Q 10/0631; Y02W 90/20; B65F 2210/1443; B65F 2210/20;
(Continued)

(56) References Cited

U.S. PATENT DOCUMENTS 5,279,258 A * 1/1994 Kakuta .............. A01K 1/0117
119/163
2008/0202357 A1 * 8/2008 Flood .................. B30B 9/3007
100/35
(Continued)

FOREIGN PATENT DOCUMENTS

FR        2855262 A1   11/2004
JP        2 989076 B2  12/1999
(Continued)

OTHER PUBLICATIONS

Written Opinion of the International Searching Authority; PCT/EP2014/000224.
(Continued)

*Primary Examiner* — Daniel Previl
(74) *Attorney, Agent, or Firm* — Ziegler IP Law Group, LLC

(57) ABSTRACT

A sensor device used in remote monitoring of waste within a waste container includes a sensor arrangement for monitoring the waste and for generating a corresponding waste-indicative signal, a data processing arrangement for receiving the waste-indicative signal, a wireless interface coupled to the data processing arrangement for enabling the data processing device to emit wireless signals including information derived from the waste-indicative signal, and a power source for providing power to operate the sensor device. The sensor arrangement additionally includes a temperature sensor for measuring a temperature of at least the power source, and the data processing arrangement is operable to be switched from the second reduced-power mode to the first activated mode as a function of the temperature measured by the temperature sensor. This enables power saving and increased service life of the sensor, battery, and the waste container.

20 Claims, 3 Drawing Sheets

(51) Int. Cl.
    *G08B 21/18*     (2006.01)
    *G06F 1/32*     (2006.01)
    *G01D 4/00*     (2006.01)
    *G01D 11/24*     (2006.01)
    *G06Q 10/00*     (2012.01)

(52) U.S. Cl.
    CPC ........... *G06F 1/3203* (2013.01); *G08B 21/18* (2013.01); *B65F 2210/1443* (2013.01); *B65F 2210/20* (2013.01); *G06Q 10/30* (2013.01); *Y02B 90/241* (2013.01); *Y02W 90/20* (2015.05); *Y04S 20/32* (2013.01)

(58) Field of Classification Search
    CPC ...... G01D 11/245; G01D 4/002; G01D 11/30; G01G 15/006; G01G 17/04; G01G 3/16; G01N 2035/00217; G01N 35/1002; G01N 25/00
    USPC .. 340/506, 514, 525, 539.1, 539.12, 539.17, 340/539.31, 539.32, 568.2, 568.8, 572.3, 340/636.1, 691.6, 825.23
    See application file for complete search history.

(56) References Cited

U.S. PATENT DOCUMENTS

2010/0224913 A1* 9/2010 Chiang .............. G01N 27/4146
    257/253
2010/0251937 A1* 10/2010 Murray ................. B01D 53/02
    106/705
2013/0278067 A1* 10/2013 Poss ...................... B65F 1/0033
    307/62

FOREIGN PATENT DOCUMENTS

| | | |
|---|---|---|
| JP | 2989076 B2 | 12/1999 |
| WO | 2008/020223 A1 | 2/2008 |
| WO | 2012/015664 A1 | 2/2012 |
| WO | 2012/151185 A1 | 11/2012 |

OTHER PUBLICATIONS

International Search Report; PCT/EP2014/000224; Jun. 20, 2014; 3 pages.
Combined Search and Examination Report received for United Kingdom Patent Application No. GB1301499.8, dated Jul. 24, 2013, 5 pages.
Examination Report received for United Kingdom Patent Application No. GB1301499.8, dated Jun. 19, 2014, 3 pages.
International Search Report received for International Patent Application No. PCT/EP2014/000224, dated Jun. 20, 2014, 4 pages.

* cited by examiner

SENSOR DEVICE FOR REMOTE MONITORING

FIELD

The aspects of the disclosed embodiments relate to sensor devices for remote monitoring of waste within waste containers. Moreover, the aspects of the disclosed embodiments also relate to methods of remotely monitoring waste within waste containers. Furthermore, the aspects of the disclosed embodiments relate to software products recorded on machine-readable data storage media and executable upon computing hardware of the sensor devices for executing the aforesaid methods.

BACKGROUND

In nature, populations of animals grow in proportion to available food supply; when populations of animals grossly exceed their available food supply, population collapse often results. In the case of the human population, a similar growth trend has occurred, on account of enhances in methods of food production and availability of sources of energy, for example fossil hydrocarbon fuels, for providing energy for farming and food distribution. The human population is presently around 7 billion people and growing at an approximately exponential trajectory as a function of time. An eventual human population collapse from circa 9 billion people to around 500 million to 1 billion people is expected to occur at a point in time in the future as effects of "peak oil" begin to impact economies of technologically-advanced societies, and energy-per-capita begins to reduce to non-sustainable levels; such a scenario is elucidated in a publication "The Olduvai Theory: Energy, Population and Industrial Civilization", Dr. Richard C. Duncan, Winter 2005-2006, J. Social Contract. The Bilderberg Group and the United Nations have been concerned about potential future human population collapse for many years and have recommended various policies to try to address this issue at an international level.

In technologically-advanced societies, for example as a result of mechanisation in farming, a relatively smaller portion of human population is required to execute functions of food production and food distribution, thereby enabling a remainder of the human population to concentrate on other activities, often within urban environments. From United Nations statistics, soon over 50% of World human population will be living in urban environments (namely "*homo urbanis*").

Human activity creates waste, wherein such waste needs to be removed from urban environments in order to avoid a disruption of orderly functioning of such urban environments. As human population grows as aforementioned, existing resources become divided amongst ever more people, such that an increase in operating efficiency of human society is needed if a standard of living enjoyed by people is to be maintained in future. Operating efficiency of human society can be increased by employing recycling, wherein waste in itself becomes a potential resource. However, recycling activities themselves require resources, for example hydrocarbon fossil fuel for propelling waste collection vehicles, and salaries of waste collection staff which are subsequently used by to buy products and services requiring resources for their implementation. Thus, it is important, for a sustainable human population, that waste recycling activities are implemented in such a manner that they provide a net real benefit to the population.

The exponential growth in urban human population, the development of social economy, and improvements in human living standards have resulted in a significant increase in the amount of waste generation. It has thus been necessary to develop new technologies which aid efficient management of waste in urban environments. More recently, urban waste has been viewed as a resource, especially when its materials can be recycled, thereby avoiding environmental damage resulting from primary resource extraction activities; for example, urban waste includes many organic materials which can be bio-converted to peat-like materials, and many combustible materials which can be employed as a source of heating fuel in communal incinerators, for example in combined heat-and-power facilities.

In order that urban waste can be most beneficially recycled and/or disposed of, it is desirable that waste disposal methods are as efficient as possible in relation to resource utilization, for example energy utilization and personnel resource utilization.

In a published United States patent no. U.S. Pat. No. 7,957,937B2 ("Systems and methods for material management"; Applicant—WM Trash Monitor Plus; Inventor—Waitkus), there is described a system and method for scheduling the emptying or replacement of a waste container based upon a degree to which the container is filled with waste, or a pattern of usage of the container. Such factors are considered to predict when the waste container will become completely full, and thus requiring to be emptied. Moreover, the system and method are operable to consider customer preferences and/or limitations of a waste hauler which is utilized to empty the waste container; the system and method determine, based upon the factors, an optimal time for the waste container to be emptied or replaced by the waste hauler. Furthermore, the factors are also used to determine when to accomplish suitable scheduling, namely when to notify the waste hauler that the waste container should be emptied or replaced at a given time. The method employs a computerized scheduling sub-system for scheduling purposes. However, such a system may struggle in a real-world situation due to lack of optimized approaches and accurate prediction algorithms, thereby requiring improved sensors which overcome these issues in a more efficient manner.

Smart waste containers are known; for example, in a published U.S. patent application no. US2009/0126473A1 ("Method and device to indicate the content of garbage cans and vessels"; Inventors—Porat, Havosha, Shvarzman and Katan), there is described a measuring arrangement for measuring the content of vessels and relaying that information to persons remote from the vessels. However, such a measuring arrangement employs algorithms that may require updating and maintenance, as well as incurring in use high data-transmission costs, as well as other maintenance activities such as frequent battery changes. Thus, in relation to smart waste containers, there is a considerable contemporary need for improved remote sensors for use in smart waste containers that address aforementioned problems in a more efficient manner.

Although systems and apparatus for smart waste container collection are known, there exists a need for a sensor device for use in remote monitoring of waste within a waste container enabling optimized collection of waste in urban environments.

For example, in a published International Publication No. WO/2012/015664 (Electrically—Powered Programmable Waste Enclosure; Inventors—POSS, and SATWICZ; Applicant—BIG BELLY SOLAR, INC., US) there is described a waste enclosure device comprising a waste enclosure employing operational functions including collection and monitoring capacity wherein said device includes one or more programmable logic controllers. Operational functions are performed by electrical components including sensors to determine waste deposits characteristics and contents. Said device operational functions are further adapted to send and receive data, optionally wirelessly, and configured and adapted to utilize solar derived electric power and, optionally, electric power from other sources. Further said publication proposes to use solar collectors connected to battery for charging the batteries in the device. This solution is costly and complex and requires parts which might get broken during the operations.

Another example, in a published International Publication No. WO/2008/020223 (context monitoring for remote sensor platforms; Inventors-ROBINSON and LAM; Applicant—Circuitree Limited, GB) there is described a remote sensor platform for asset tracking monitors the context of the local environment to conserve power. Primary sensors (2) monitor local environment stimuli such as temperature (4), pressure or illumination (8). A low-power processor (16) uses the primary sensors (2) to monitor the environment and thereby determine whether to activate a secondary high power sensor (10), such as a GPS unit (12) or humidity or gas sensor (14). The low power processor may be triggered by the primary sensors (2) and may use configurable rules (22) for decision making. It may log exceptions (24) and sensor data for further decision making. A high-power processor (28) sends sensor data via a reporting means (34) to a server (40) using secondary configurable rules (3) conditionally on the primary (2) and secondary (10) sensor inputs. The server (40) can update the rules (22,30).

Document WO 2012/151185 presents a method and apparatus for preventing excessive battery passivation in an electronic meter-reading module. The module operates in a low-power state most of the time. The low-power state is interrupted at defined transmit times, wherein the module temporarily turns on or otherwise activates an included communication transmitter, for wireless transmission of data to a remote node. Because of its low current draw during the times between data transmissions, the module's battery is vulnerable to passivation layer buildup. Advantageously, however, the module is configured to perform dummy activations of its transmitter at times other than the defined transmit times, e.g., in the intervals between data transmissions. These dummy activations are not for data transmission, but rather are temporary activations of the relatively high-power transmitter, for reducing passivation layer buildup on the battery in advance of a next data transmission. Document JP 2989076 presents a terminal network controller provided with a battery, a microcomputer and a voltage detection circuit. The microcomputer serves to perform chloride film removal operation every specified time, conduct the chloride film removal operation after a certain time again in the case whether a voltage lowering detection signal is input from the voltage detection circuit during the chloride film removal operation and discriminate whether there is the voltage lowering detection signal at the time.

Waste management industries are growing and need efficient processes to increase revenue margins and to optimize associated resource utilization. From data provided in "Environmental Business International" publication, the US solid waste industry has grown from a value of 39.4 billion US dollars in the year 2000 to a value of 52.40 billion US dollars in the year 2010.

Waste collection companies face various challenges when implementing collection of sensor data in smart waste containers deployed at various sites and recycling stations at different locations; the challenges include the following, for example:

(i) battery-operated sensors potential stop operating when their source of operating power is exhausted and often require frequent service;
(ii) there is a need to try to avoid high-costs associated with data transmission, as well as wireless radiation footprint;
(iii) there is a need to ensure a long service life of the smart waste container; and
(iv) there is a need to reduce sensor-complexity, for example for reducing manufacturing costs and resources used in manufacturing the sensors.

For example, it is highly inefficient for waste collection companies and end users to have to execute regular servicing of the waste container to ensure its proper functioning. However, it is desirable to improve an efficiency of the sensor deployed in waste container, so that fewer resources are utilized in its operation.

SUMMARY

The aspects of the disclosed embodiments seek to provide an improved sensor device for use in remote monitoring of waste within a waste container.

Moreover, the aspects of the disclosed embodiments seeks to provide an improved method of performing remote monitoring of waste in waste containers.

Furthermore, the aspects of the disclosed embodiments seek to provide status information about monitored waste containers served by a waste collection system.

Additionally, the aspects of the disclosed embodiments seek to improve a service life of a sensor system used in a smart waste container and thereby improving service life of the smart waste container, as well as improving safety.

According to a first aspect of the disclosed embodiments, there is provided a waste collection system as defined in appended claim 1: there is provided a sensor device for use in remote monitoring of waste within a waste container, wherein the sensor device includes a sensor arrangement for monitoring the waste and for generating a corresponding waste-indicative signal, a data processing arrangement for receiving the waste-indicative signal, a wireless interface coupled to the data processing arrangement for enabling the data processing device to emit wireless signals including information derived from the waste-indicative signal, and a power source for providing power to operate the sensor device, characterized in that:

(i) the power source includes one or more batteries;
(ii) the data processing arrangement including a processor unit having a low power functioning side, the data processing arrangement including an ultrasonic transceiver for measuring a fill level within the waste container, the data processing arrangement is capable of operating in a first activated mode wherein it is energized to be capable of supporting wireless communication via the wireless interface, and a second reduced-power mode wherein the data processing arrangement is operable to consume less power in comparison to the first activated mode;
(iii) the sensor arrangement additionally includes a temperature sensor for measuring a temperature of at least the power source, and the data processing arrangement is operable to be switched from the second reduced-power mode to the first activated mode as a function of the temperature measured by the temperature sensor; and (iv) the sensor arrangement is configured to receive further temperature information from an external service.

The invention is of advantage in that selective use of power from the power source for operating the sensor device as a function of temperature is capable of increasing an efficiency of utilization of power stored in the power source.

Optionally, in the sensor device, the data processing arrangement includes a low-power circuit for measuring the temperature measured by the sensor arrangement, and for causing the data processing arrangement to be switched from its second reduced-power mode to its first activated mode as a function of variations in the measured temperature.

Optionally, in the sensor device, the data processing arrangement is operable to revert from the first activated mode to the second reduced-power mode upon one or more of:
(a) receiving and/or sending a wireless signal via the wireless interface; and
(b) making a measurement via the sensor arrangement regarding a state of the waste within the waste container.

Optionally, in the sensor device, the data processing arrangement is operable to monitor diurnal variations in temperature as measured by the sensor arrangement, and is switchable from the second reduced-power mode to its first activated mode at one or more times in a diurnal period whereat the temperature of the power source is substantially minimum. More optionally, in the sensor device, the one or more times in the diurnal period whereat the temperature of the power source is substantially minimum is determined by the data processing arrangement by way of temporal prediction based on earlier historical measurements.

Optionally, in the sensor device, the power source includes a Lithium-ion battery for providing operating power to the sensor device.

Optionally, the sensor device is operable to emit a warning message via the wireless interface in an event that the temperature monitored by the sensor arrangement exceeds a predefined threshold temperature.

Optionally, the sensor device is filled with a filler material that is of lower density then the outer casing material to thermally insulate battery and temperature sensor from ambient temperature outside of the sensor device to enable longer data communication time window at specified temperatures.

Optionally, the sensor device filler material is polyurethane foam and the casing material of the sensor device is polyurethane allowing for improved data communication conditions of the sensor device.

According to a second aspect of the disclosed embodiments, there is provided a method of using a sensor device to perform remote monitoring of waste within a waste container, wherein the sensor device includes a sensor arrangement for monitoring the waste and for generating a corresponding waste-indicative signal, a data processing arrangement for receiving the waste-indicative signal, a wireless interface coupled to the data processing arrangement for enabling the data processing device to emit wireless signals including information derived from the waste-indicative signal, and a power source for providing power to operate the sensor device, characterized in that the method includes:
(i) arranging for the power source to include one or more batteries;
(ii) operating the data processing arrangement to include a processor unit having a low power functioning side and an ultrasonic transceiver for measuring a waste-indicative signal within the waste container, the data processing arrangement operating in a first activated mode wherein it is energized to be capable of supporting wireless communication via the wireless interface, and in a second reduced-power mode wherein the data processing arrangement is operable to consume less power in comparison to the first activated mode;
(iii) using a temperature sensor of the sensor arrangement for measuring a temperature of at least the power source, and arranging for the data processing arrangement to be switched from the second reduced-power mode to the first activated mode as a function of the temperature measured by the temperature sensor; and
(iv) receiving further temperature information from an external service.

Optionally, the method includes employing a low-power circuit of the data processing arrangement for measuring the temperature measured by the sensor arrangement, and for causing the data processing arrangement to be switched from its second reduced-power mode to its first activated mode as a function of variations in the measured temperature.

Optionally, the method includes operating the data processing arrangement to revert from the first activated mode to the second reduced-power mode upon one or more of:
(a) receiving and/or sending a wireless signal via the wireless interface; and
(b) making a measurement via the sensor arrangement regarding a state of the waste within the waste container.

Optionally, the method includes using the data processing arrangement to monitor diurnal variations in temperature as measured by the sensor arrangement, and switching the data processing arrangement from the second reduced-power mode to the first activated mode at one or more times in a diurnal period whereat the temperature of the power source is substantially minimum. More optionally, in the method, the one or more times in the diurnal period whereat the temperature of the power source is substantially minimum is determined by the data processing arrangement by way of temporal prediction based on earlier historical measurements.

Optionally, the method includes using a Lithium-ion battery power source for providing operating power to the sensor device.

Optionally, the method includes operating the sensor device to emit a warning message via the wireless interface in an event that the temperature monitored using the sensor arrangement exceeds a predefined threshold temperature.

According to a third aspect of the disclosed embodiments, there is provided a software product recorded on machine-readable data storage media, characterized in that the software product is executable upon computing hardware of the sensor device pursuant to the first aspect of the invention, for enabling the sensor device to execute the method pursuant to the second aspect of the disclosed embodiments.

It will be appreciated that features of the disclosed embodiments are susceptible to being combined in various combinations without departing from the scope of the disclosed embodiments as defined by the appended claims.

DESCRIPTION OF THE DIAGRAMS

Aspects of the the disclosed embodiments will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION

Figure 1:
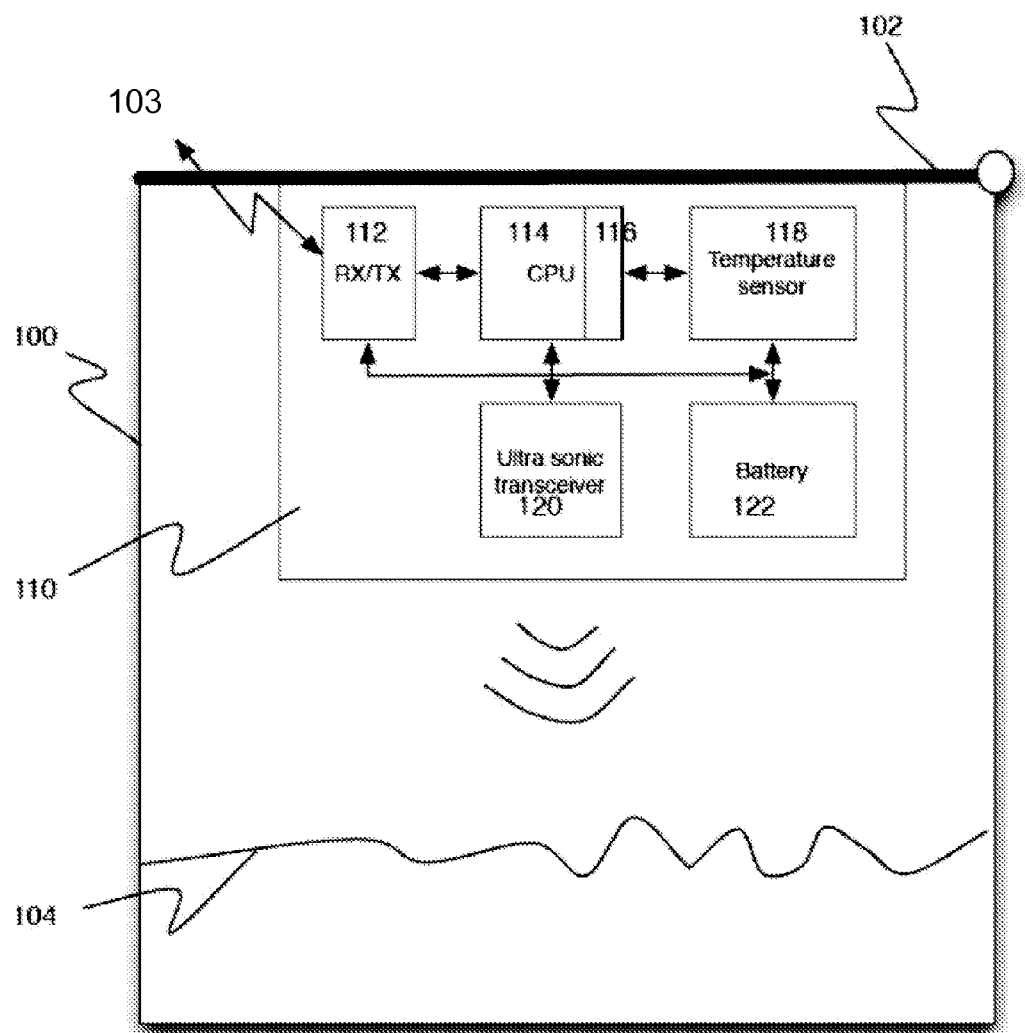
FIG. 1 is an illustration of a waste container, for example a trash bin, with components of a sensor system.

Referring to FIG. 1, there is shown an illustration of a trash bin 100 which is provided with a pivotally-mounted 102 at an upper region of the trash bin 100. A trash fill level 104 is measured using a sensor device 110. The sensor device 110 has component parts including a receiver/transmitter RX/TX 112 for communicating information indicative of the trash fill level 104, for example by using data communication over a 2G or 3G network or any other wireless communication medium for communicating wireless signals. A low-power data processing arrangement 103 includes a processor unit CPU 114 which includes a low power functioning side 116, a temperature sensor 118 for measuring a temperature inside of the sensor device 110, an ultrasonic transceiver 120 for measuring the fill level 104, and a power source such as a battery 122 for providing operating power to the sensor device 110. In some example embodiments of the invention, a part of a power management functionality for the entire sensor device 110 is based on using information from the temperature sensor 118 of the sensor device 110, namely to measure the temperature inside of the sensor device 110. In operation:

(i) the temperature sensor 118 is beneficially used to trigger a wake-up for CPU functionalities via, for example, a change of digital state of low power interrupt logic of the low power functioning side 116;

(ii) the temperature sensor 118 in cooperation with the CPU 114 is used to collect one or more temperature profiles as function of time; and (iii) the sensor device 110 is operable to receive temperature forecast from one or more external services. In certain example embodiments of the invention, parts such as the RX/TX 112, which consume a relative large amount of power in the sensor device 110, are used when the temperature of the sensor device 110 is at a lowest point of a given day, namely diurnal temperature cycle, based on learned temperature history, received temperature forecast and/or measured current temperature. In addition, other parts of the sensor device 110 are beneficially energized only when the temperature is at the lowest point during a desired time window, fore example diurnal period. Additionally, the temperature sensor 118 is configured to generate a wakeup alert message, if the temperature of the sensor device 110 exceeds a predefined temperature threshold, for example the temperature becomes excessive, for example, the trash bin 100 is over heating or even burning.

The sensor device 110 includes a low-power data processing arrangement 103 for processing a temperature-indicative signal generated by the temperature sensor 118, and for causing the data processing arrangement CPU 114 to be switched from its second reduced-power mode to its first activated mode as a function of variations in the measured temperature. This enables substantial saving in battery power and increases a service life of the trash bin 100 and the sensor 110, before a battery recharge or battery replacement is required.

Beneficially, the sensor device 110 has various settings which are used to turn ON/OFF wireless communication to and/or from the sensor device 110, namely for selectively activating the data processing arrangement 103 and the CPU 114 to revert from the first activated mode to the second reduced-power mode upon one or more of:

(i) receiving and/or sending a wireless signal via the wireless interface RX/TX 114: and (ii) making a measurement via the ultrasonic transceiver 120 regarding a state of the waste within the trash bin 100.

Such a manner of operation is susceptible of providing more efficient selection of collection time of waste from the trash bin 100, resources and money for waste collection services. Moreover, there is thereby provided a reduction of environmental impact of waste collection and recycling, for example by using less fuel and equipment as well as less wear-and-tear for executing waste collection. Significant increase in service life of the trash bin 100, its sensor device 110 and its associated battery are capable of being achieved.

The temperature sensor 118 utilizes minimal power to monitor diurnal variations in temperature, similarly sensors of the sensor arrangement including the ultrasonic transducer 120, and is switchable from the second reduced-power mode to its first activated mode at one or more times in a diurnal period, whereat the temperature of the power source is substantially minimum. One or more times when the temperature of the power source is substantially minimum is determined by CPU 114, for example by way of temporal prediction based on earlier historical measurements.

Optionally, as a safety measure, the sensor device 110 is operable to emit a warning message via the wireless interface RX/TX 114 in an event that the temperature monitored by the sensor arrangement, namely including the temperature sensor 118, exceeds a predefined threshold temperature. This may prevent overfill, and such a warning system is beneficially operable to provide a warning in an event that the trash can 100 is burning or has a very high temperature that may cause permanent damage to the trash can 100 and poses a potential risk to its surroundings.

The sensor device 110 has an inbuilt battery, for example a Lithium ion battery, for providing power to operate electronic circuits included in the sensor device 110, for example the ultrasonic transceiver 120 and a telecommunication modem, for example GSM-based, employed for implementing the wireless interface RX/TX 114. One characteristic of many electrochemical batteries, for example Lithium batteries, is that their efficiency is a function of their temperature in comparison, an example, to their 100% charge level; for example, a typical Li-ion laptop battery that is fully charged most of the time at 25° C. (77° F.), will irreversibly lose approximately 20% if its energy capacity per year. However, a battery stored inside a poorly ventilated device may be subject to a prolonged exposure to much higher temperatures than 25° C., which will significantly shorten its life. The capacity loss begins from the time the battery was manufactured, and occurs even when the battery is unused. Different storage temperatures produce different loss results, for example a 6% loss per year at 0° C. (32° F.), a 20% loss per year at 25° C. (77° F.), and a 35% loss per year at 40° C. (104° F.). When the battery is stored at 40% charge level, such temporal capacity decline pr year is reduced to 2%, 4%, 15% at 0° C., 25° C. and 40° C. respectively. The sensor device 110 is operable to try to draw power from its battery 122 at an optimal time when the battery will provide greatest longevity of operation, namely as determined by the low-power interrupt logic 116 included in the CPU 114 namely to function to prolong the battery 122 life of the sensor device 110.

Based on an alternative embodiment the sensor device 110 is preferably hermetically closed structure with limited or no access to the interior of the device 110 for maintenance or similar. This is a benefit since the sensor device is typically in very harsh environment and has a robust construction. By making the casing of the sensor device 110 totally enclosed enables the sensor device 110 to withstand moisture, liquid, dust, impacts, vapours etc. often present in harsh environments such as waste containers, trash cans, or storage vessels. The closed structure sets certain challenges for the batteries used in the device. The battery life of the device has to be long lasting for example several months or years or at least match the typical replacement time of the waste container or container lid itself in order to have feasible device which needs no maintenance. In one preferred embodiment the casing of the sensor device 110 is made of a robust polymer that handles high as well as low temperatures (e.g. ca +/−45 C), such as polyurethane or similar. According to further embodiments the housing of the device can be filled with a filler material epoxy or other compounds, for example polyurethane foam to ensure that all components (112, 114, 116, 118, 120, 122) in side of the housing are permanently and securely attached to the structure and to ensure that electronics of the device are protected from environment, moisture, impacts etc. It is suitable to have the filler material of a lower density than the casing material used for the sensor device 110. This allows the sensor device to have a mechanically rigid and dampening structure while also having an overall lower heat capacity than a solid sensor device 110 construction. This lower heat capacity allows the temperature changes between the sensor device 110 and the surrounding conditions within the waste container as well as outside the waste container.

Bases on test performed with the sensor device 110 it has been further found out that selection of the filler material has impact on the energy consumption of radio communication. Preferably the filler material should be polyurethane foam or similar due to its better RF characteristics compared to epoxy and to free air. In certain radio antenna setups it has been seen that part of the radio waves are absorbed by epoxy that has significantly higher density than polyurethane or polyurethane foam. Alternative casing materials and filler materials other than polyurethane would be polystyrene based foam or ETA (ESD (electro sensitive devices) safe polyethylene) based foam.

Additionally selecting polyurethane foam or similar as filler material has impact on energy consumption and durability of the batteries since the heat conductivity of the polyurethane is very low. Battery inside of the device can remind longer time in desired operating temperatures when the device is filled with the filler material with good insulating properties. In one embodiment the temperature sensor is located near battery of the sensor device 110 to measure actual temperature of the battery instead of ambient temperature outside of the device (for example inside of the waste container). The temperature sensor 118 and the battery 122 are at least partly positioned inside of the filler material in an embodiment. Thermally insulating battery and the temperature sensor from ambient temperatures outside of the sensor device enables longer possible communication time-window since the temperature changes within the sensor device are slow.

Further filler material selection has impact on water condensation to the outer surface of the sensor device. If the filler material is selected from group of material that is light and has good thermal insulation (such as polyurethane foam) properties instead of heavy material (such as epoxy) the thermal capacity of the sensor device 110 is low. When an ambient temperature around the smart waste container falls, for example at dusk, moisture inside the smart waste container condenses on the on the sensor device 110. Condensed water is potentially capable of interfering with operation of electronic components included in the sensor device 110 and also with for example ultrasonic transceiver 120 which require significant excitation potentials. Moreover, as the ambient temperature further drops, for example on a cold night after the aforementioned dusk, the moisture can freeze which potentially causes further problems. Selection of proper filler material thus reduces problems related to formation of ice on the ultrasonic transceiver 120. Further power savings are achieved since there is no need to heat and melt the ice and/or use more excitation energy for the ultrasonic transceiver 120.

Figure 2:
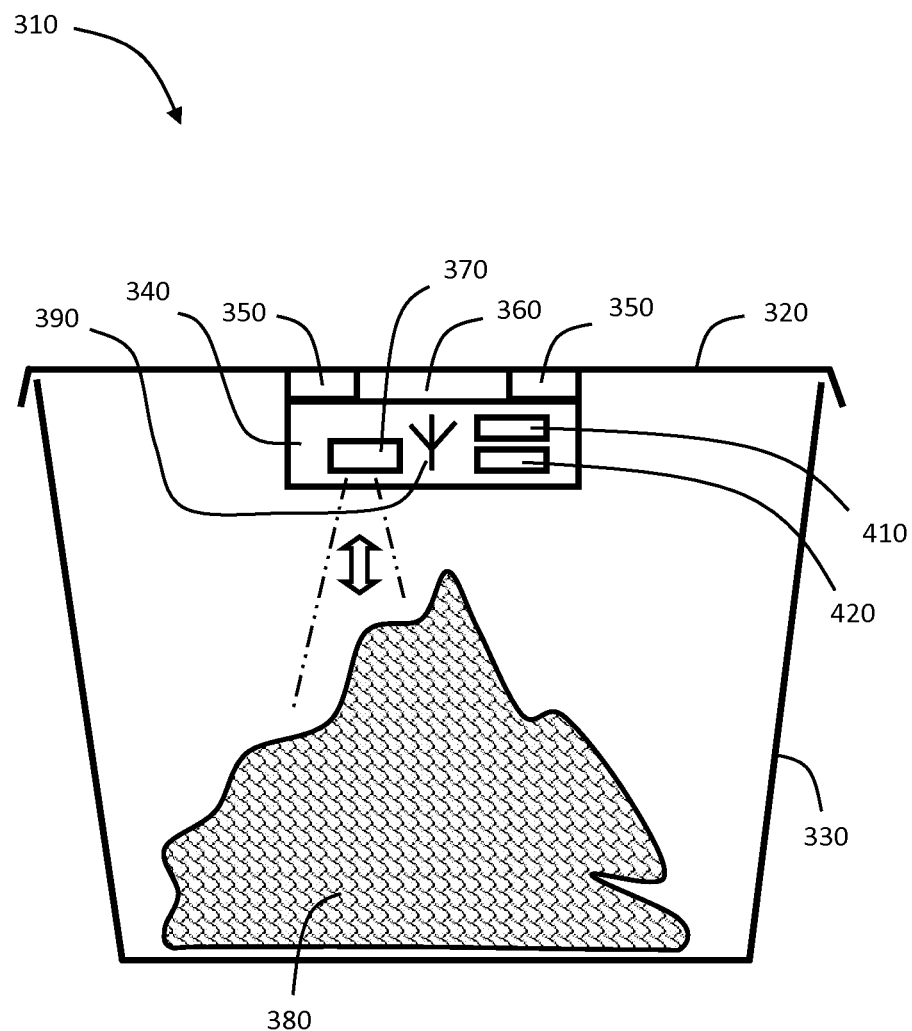
FIG. 2 is an illustration of an example waste container which has a sensor mounted thereupon.

Referring next to FIG. 2, a waste collection system 310 includes one or more waste containers 330, and is operable to monitor their spatial locations within an urban environment, their waste fill level 380 pertaining to their inside volume. In respect of the waste container 330 with its associated lid 320, the waste fill level 380 is measured using a sensor device 340. The sensor device 340 is attached to the waste container 330 by a fastening arrangement 350. The sensor device 340 includes component parts such as a wireless transceiver RX/TX 360, for communicating information indicative of the waste fill level 380, for example by using wireless data communication via a 2G or 3G wireless communication network or any wireless communication medium for sending wireless signals. The low power data processing arrangement includes a CPU 410 with low power functioning side, a temperature sensor 390 for measuring the temperature inside of the device 330, an ultrasonic transceiver 370 for measuring the waste fill level 380, and a power source such as a battery 420. According to embodiments of the invention, part of the power management for the entire sensor device 340 is based on using information from temperature sensor of the sensor device 340; in other words, an essential element of the aspects of the disclosed embodiments is to measure the temperature inside of the sensor device 340. In operation:

(i) the temperature sensor is used to trigger wake-up for functionalities of the CPU 410, for example via control derived from the low power interrupt logic 605;

(ii) the temperature sensor/CPU 410 is used to sense and record a temperature profile as function of time, for example for providing a wake-up alert message in an event that the sensed temperature is too high, for example the waste container 330 is burning; and (iii) the sensor device 340 is operable to receive one or more temperature forecasts from one or more external services. In embodiments of the invention, high power-consuming parts such as wireless transceiver RX/TX 360 are energized substantially only when the temperature is at a lowest point of the day based on learned temperature history, received forecast and/or measured current temperature. In addition, other parts of the sensor device 340 are optionally energized only when the temperature is at a lowest point during a desired time window.

The sensor device 340 is operable to utilize an optimal energy for the operation of the waste container 330, for example one or more fill state signals are communicated only at an optimal operating temperature which enables reduced power depletion from the battery 420, thereby maximizing service life for the waste container 330, whilst complying with safety requirements and service quality criteria to avoid imposition of fines and penalties for allowing one or more of the waste containers 330 to become overfilled and/or their waste level 380 to reach a physical state that could represent a safety hazard, for example spread of disease and pests, for example rodents, arising from exposed food wastes. Optionally, temperature measurements in respect of a given waste container 330 can be used to be representative of other waste containers 330 in a similar given geographical area, thereby reducing a total amount of information needing to be communicated via wireless communication to and from the waste containers 330. For example, only one or two waste containers 330 in a specific geographical region to be used to control the activation and deactivation of the sensor devices 340 in all the geographical region based on, for example, a general temperature pertaining the geographical region, for example a part of a city. Such selective use of wireless communication is also susceptible to increase battery service life for the sensor devices 340.

Optionally, the sensor system 310 and its associated sensor devices 340 are used for other applications which require regular monitoring based on temperature change, where remote battery-powered operation is required.

In one aspect of the disclosed embodiments, the sensor device 340 is operable to save battery power and thereby prolong the service life of the sensor device 340. This enables less frequent battery changes at service intervals.

The trash can 100 described in the foregoing is sometimes also referred as one or more of the following: a waste container, a refuse receptacle, a waste receptacle, a container bin, a dustbin, a rubbish bin, a refuse bin, a litter bin, a litter receptacle, a kitchen bin, a garbage can, a trash can, a trash barrel, a trash barn, a wheelie bin, a mobile garbage bin, a herbie curbie, a waste basket, a wastepaper basket, a wastebasket but is not limited to the specific type of container that can be used for collecting waste, for example injection molded container, extruded metal containers, diecast containers, and so forth.

Figure 3:
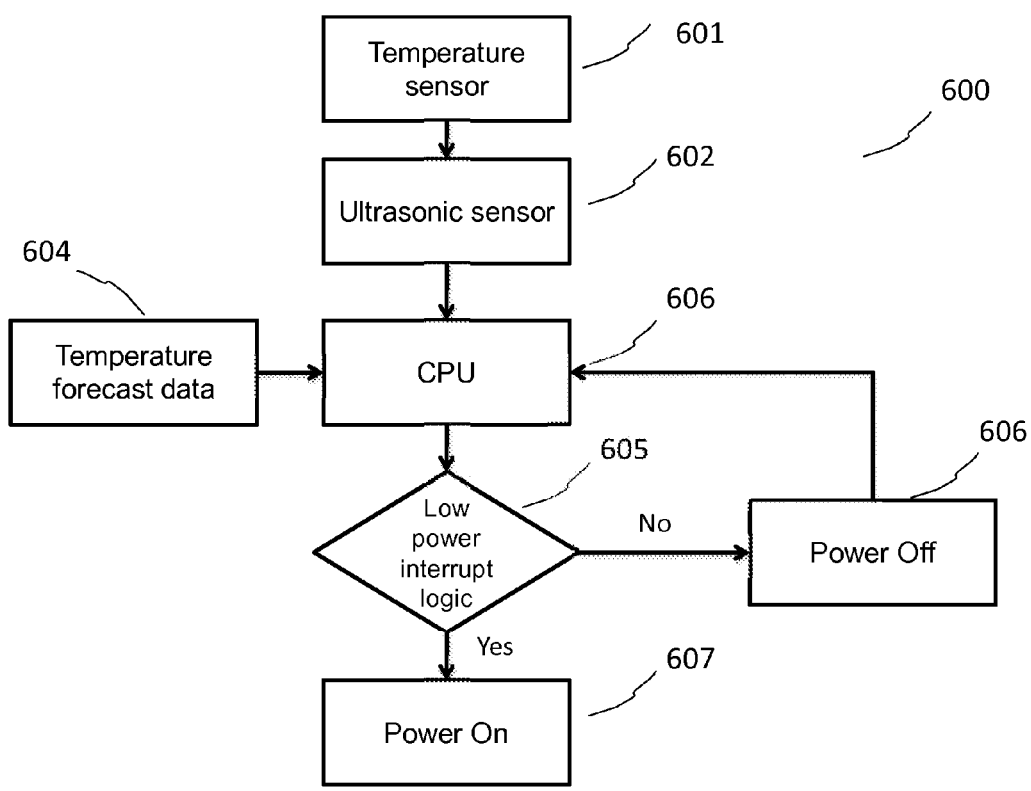
FIG. 3 is a flow chart of a method of operating the sensor of FIG. 2.

Referring next to FIG. 3, there is shown a flow chart 600 of steps of a method of operating the sensor device 340 operation with its associated components of the wireless transceiver RX/TX 112 which is employed for sending information indicative of the trash fill level 380, for example by using data communication over a 2G or 3G wireless communication network or any wireless communication medium for sending wireless signals. The temperature sensor 601 collects one or more temperature profiles as function of time; in other words, the temperature sensor collects and sends information to the CPU 606. The ultrasonic transceiver 602 for measuring the fill level 380 of the container 330 sends signals to the CPU 606; in other words, the ultrasonic transceiver determined fill state information and sends such information to CPU 606. The temperature sensor 601 and ultrasonic transceiver 602 use relatively small amount of power, and thereby do not result in depletion of the power source, such as battery, of the sensor device 340. The measured temperature is used to trigger wake-up of CPU 606 functionalities via, for example, low-power interrupt logic 605. The CPU 606 receives one or more temperature forecast 604 from one or more external services such as weather forecast services in Internet. A low power interrupt logic 605 in the CPU 606 determines whether or not the temperature is at the lowest point/or at other beneficial temperature point of the day based on learned history and/or received forecast and measured current temperature. In an event that temperature conditions are optimal or alarming, the high-power consuming parts, such as the wireless transceiver RX/TX, are employed to send a corresponding signal to the central server using data communication over a 2G or 3G wireless communication network or any wireless communication medium. Basically high power parts are turned on with switching logic 607. In an event that conditions are not optimal, the high-power consuming parts such as the wireless transceiver RX/TX remain switched off, namely de-energized, thereby saving battery power. Based on embodiments the communication from the device can be done for example by initializing Internet connectivity via packet data network or for example by using messaging services such as short message service (SMS) when the RX/TX is powered on with the switching logic 607. Benefit of using switching logic is to enable to turn off totally the power consumption of the radio part when not needed.

Example of Temperature Conditions:

At a time of year, or in geographical areas where day time temperatures are high, for example in a range of +20° C. to +40° C., and night time temperatures are lower, for example in a range of +5° C. to +20° C., it is optionally beneficial to use RX/TX only during the night time. On the other hand, in the areas or at a time of year when the night time temperatures are cold, for example in a range of −15° C. to −35° C., namely well below freezing point, it is optionally beneficial to use RX/TX when the temperature is higher than normal temperature, for example during the day time when temperatures are susceptible to rising to 5° C. In other words, an optimum operating point is optionally higher or lower than an average temperature during a given day.

Example of Operation

Some battery types such as Lithium Ion batteries have optimum operating temperatures of +20° C. If a trash can with sensor device is in environment where daily temperatures are within the trash can are high such as +80° C. but during night time round 5-10° C. it is preferred to send communication at evenings at the point when the temperature has failed to approximately to +20° C. or at the morning when the temperature has raised to approximately to +20° C.

As used herein, a power source "battery" included is a Lithium-ion battery. However, the power source "battery" is not limited to such a Lithium-ion battery and may optionally include one or more of: solar battery, alkaline battery, Aluminium battery, atomic battery, optoelectric nuclear battery, nuclear micro-battery, Bunsen cell, chromic acid cell, Clark cell, Daniell cell, dry cell, Earth battery, Frog battery, Galvanic cell, Grove cell, Leclanche cell, lemon battery, Lithium battery, Lithium air battery, Mercury battery, molten salt battery, Nickel Oxyhydroxide battery, Oxyride battery, organic radical battery, paper battery, Pulvermacher's chain, reserve battery, Silver-Oxide battery, solid-state battery, Voltaic pile, Penny battery, Trough battery, water-activated battery, Weston cell, Zinc-air battery, Zinc-Carbon battery, Zinc Chloride battery, flow battery, Vanadium redox battery, Zinc-Bromine flow battery, fuel cell, Lead-acid battery, deep cycle battery, VRLA battery, AGM battery, gel battery, Lithium air battery, Beltway battery, Lithium ion polymer battery, Lithium Iron Phosphate battery, Lithium-Sulphur battery, Lithium-Titanate battery, molten salt battery, Nickel-Cadmium battery, Nickel-Cadmium battery vented cell type, Nickel Hydrogen battery, Nickel-Iron battery, Nickel metal Hydride battery (NiMH), low self-discharge NiMH battery, Nickel-Zinc battery, organic radical battery, polymer-based battery, Polysulfide Bromide battery, Potassium-ion battery, rechargeable alkaline battery, Silicon air battery, Sodium-ion battery, Sodium-Sulphur battery, super Iron battery, Zinc-Bromine flow battery, Zinc matrix battery, Baghdad battery, biobattery, button cell, Nanobatteries, Nanowire battery, Polapulse battery, photoflash battery, smart battery system, thin film rechargeable lithium battery, traction battery, watch battery, water-activated battery, wet cell, Zamboni pile, or any other such power source.

Optionally, the waste collection system 310 can be employed in conjunction with large undergrounds waste containers or surface containers, for example waste containers having an internal waste-receiving volume in a range of 1 $m^3$ to 10 $m^3$. The waste collection system 310 is capable of providing increased hygiene, thereby reducing a risk of spread of disease within urban environments; from a viewpoint of biological considerations, urban environments represent a large monoculture of human beings which is potentially susceptible to systemic pathogens, for example bubonic plague which caused the Black Death in the mediaeval epoch in Europe, where 30% of human population was eliminated. More efficient collection of waste from the one or more containers 330 by utilizing the aspects of the disclosed embodiments is thus capable of reducing a risk in future of occurrence of such disease outbreak by preventing vectors of disease, for example rodents, from increasing in numbers.

Modifications to embodiments of the invention described in the foregoing are possible without departing from the scope of the invention as defined by the accompanying claims. Alternative uses of the monitoring of waste can also be used for monitoring of containers and storage vessels used for liquids, solids and other materials where the measurement done to indicate when the container is approaching empty and needs refilling. Expressions such as "including", "comprising", "incorporating", "consisting of", "have", "is" used to describe and claim the aspects of the disclosed embodiments are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A sensor device for use in remote monitoring of waste within a waste container, wherein the sensor device includes a sensor arrangement for monitoring the waste and for generating a corresponding waste-indicative signal, a data processing arrangement for receiving the waste-indicative signal, a wireless interface coupled to the data processing arrangement for enabling the data processing device to emit wireless signals including information derived from the waste-indicative signal, housing and a power source for providing power to operate the sensor device, wherein:
   (i) the power source includes one or more batteries;
   (ii) the data processing arrangement includes a processor unit having a low power functioning side, the data processing arrangement including an ultrasonic transceiver for measuring waste-indicative signal within the waste container, the data processing arrangement is configured to operate in an activated mode wherein the data processing arrangement is energized to support wireless communication via the wireless interface, and a reduced-power mode wherein the data processing arrangement is configured to consume less power in comparison to the activated mode;
   (ii) the housing is filled with a filler material which is capable of thermally insulating at least some of the components, and;
   (iii) the sensor arrangement additionally includes a temperature sensor for measuring a temperature of at least the power source, and the data processing arrangement is configured to be switched from the reduced-power mode to the activated mode as a function of the temperature measured by the temperature sensor.

2. A sensor device as claimed in claim 1, wherein the data processing arrangement is configured to revert from the activated mode to the reduced-power mode upon one or more of:
   (a) receiving and/or sending a wireless signal via the wireless interface; and
   (b) making a measurement via the sensor arrangement regarding a state of the waste within the waste container.

3. A sensor device as claimed in claim 1, wherein the data processing arrangement is configured to monitor diurnal variations in temperature as measured by the sensor arrangement, and is switchable from the reduced-power mode to the activated mode at one or more times in a diurnal period whereat the temperature of the power source is substantially minimum.

4. A sensor device as claimed in claim 3, wherein the one or more times in the diurnal period whereat the temperature of the power source is substantially minimum is determined by the data processing arrangement by way of temporal prediction based on earlier historical measurements.

5. A sensor device as claimed in claim 1, wherein the power source includes a Lithium-ion battery for providing operating power to the sensor device.

6. A sensor device as claimed in claim 1, wherein the sensor device is configured to emit a warning message via the wireless interface in an event that the temperature monitored by the sensor arrangement exceeds a predefined threshold temperature.

7. A sensor device as claimed in claim 1, wherein the sensor device is filled with a filler material that is of a lower density than the outer casing material to thermally insulate the one or more batteries, and the temperature sensor from an ambient temperature outside of the sensor device to enable a longer data communication time window at specified temperatures.

8. A sensor device as claimed in claim 7, wherein the sensor device filler material is polyurethane foam and the outer casing material of the sensor device is polyurethane.

9. The sensor device according to claim 1, wherein the sensor arrangement is configured to receive further temperature information from an external service.

10. A method of using a sensor device to perform remote monitoring of waste within a waste container, wherein the sensor device includes a sensor arrangement for monitoring the waste and for generating a corresponding waste-indicative signal, a data processing arrangement for receiving the waste-indicative signal, a wireless interface coupled to the data processing arrangement for enabling the data processing device to em it wireless signals including information derived from the waste-indicative signal, and a power source for providing power to operate the sensor device, wherein the method includes:
   arranging for the power source to include one or more batteries;

(ii) operating the data processing arrangement including a processor unit having a low power functioning side and an ultrasonic transceiver to measure the waste-indicative signal level within the waste container, the data processing arrangement operating in an activated mode wherein the data processing arrangement is energized to be capable of supporting wireless communication via the wireless interface, and in a reduced-power mode wherein the data processing arrangement is configured to consume less power in comparison to the activated mode; and (iii) using a temperature sensor of the sensor arrangement for measuring a temperature of at least the power source, and arranging for the data processing arrangement to be switched from the reduced-power mode to the activated mode as a function of the temperature measured by the temperature sensor.

11. A method as claimed in claim 10, wherein the method includes operating the data processing arrangement to revert from the first activated mode to the second reduced-power mode upon one or more of:
(a) receiving and/or sending a wireless signal via the wireless interface; and
(b) making a measurement via the sensor arrangement regarding a state of the waste within the waste container.

12. A method as claimed in claim 10, wherein the method includes using the data processing arrangement to monitor diurnal variations in temperature as measured by the sensor arrangement, and switching the data processing arrangement from the reduced-power mode to the activated mode at one or more times in a diurnal period whereat the temperature of the power source is substantially minimum.

13. A method as claimed in claim 12, wherein the one or more times in the diurnal period whereat the temperature of the power source is substantially minimum is determined by the data processing arrangement by way of temporal prediction based on earlier historical measurements.

14. A method as claimed in claim 10, wherein the method includes using a Lithium-ion battery power source for providing operating power to the sensor device.

15. A method as claimed in claim 10, wherein the method includes operating the sensor device to emit a warning message via the wireless interface in an event that the temperature monitored using the sensor arrangement exceeds a predefined threshold temperature.

16. A software product recorded on non-transitory machine-readable data storage media, wherein the software product is executable upon computing hardware of the sensor device of claim 1, for enabling the sensor device to execute the method of claim 10.

17. A method as claimed in claim 10, wherein temperature information is received from an external service.

18. A method as claimed in claim 10, wherein the method includes using the data processing arrangement to monitor diurnal variations in temperature as measured by the sensor arrangement, and switching the data processing arrangement from the reduced-power mode to the activated mode at one or more times in a diurnal period whereat the temperature of the power source is substantially maximum.

19. The method according to claim 10, comprising receiving further temperature information from an external service.

20. The method according to claim 10, comprising using the data processing arrangement to monitor diurnal variations in temperature as measured by the sensor arrangement, and switching the data processing arrangement from the reduced-power mode to the activated mode at one or more times in a diurnal period whereat the temperature of the power source is substantially maximum.

\* \* \* \* \*